Sept. 5, 1933.   R. HALL   1,926,003
EXPANSION JOINT
Filed Aug. 25, 1932
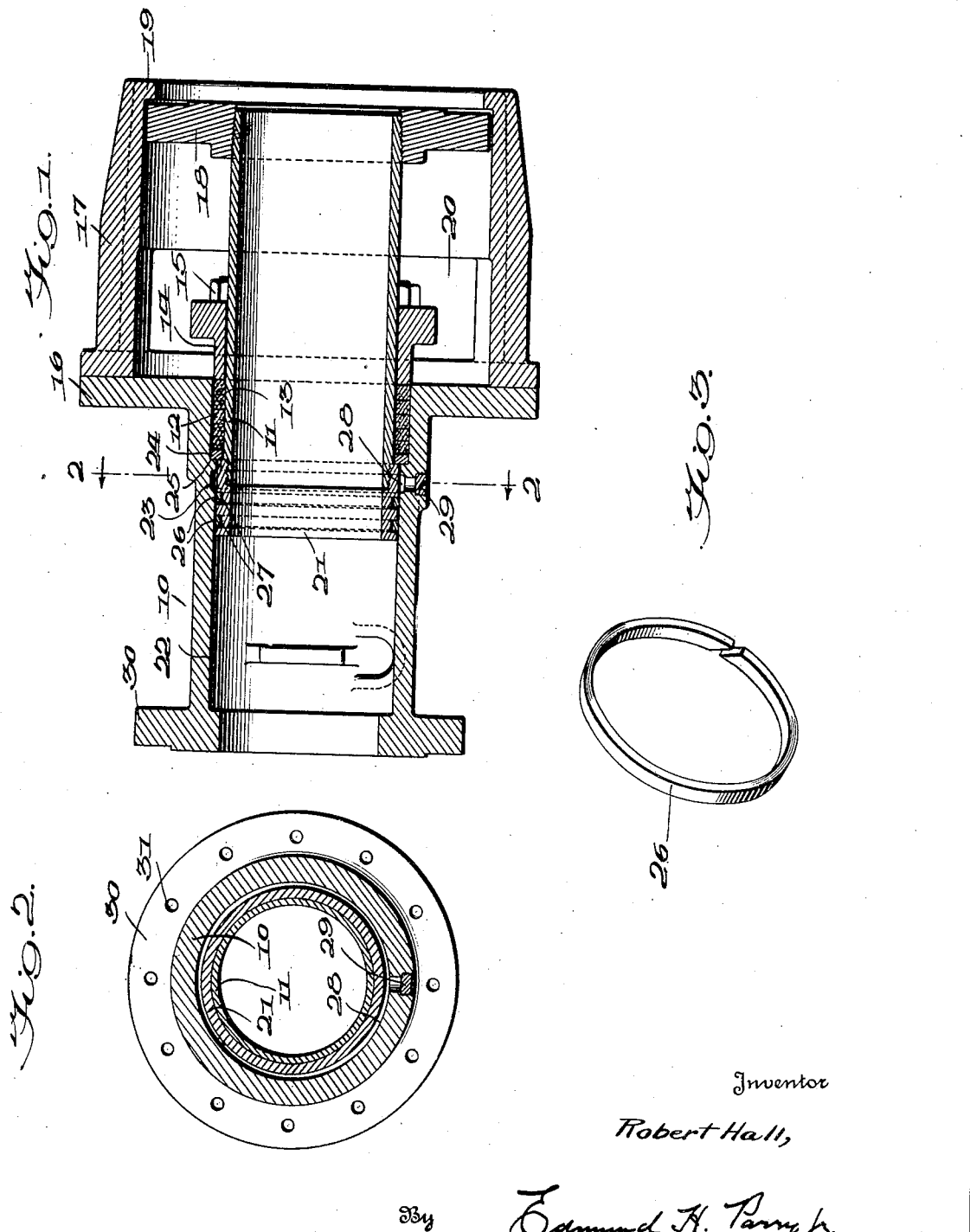
Inventor
Robert Hall,
By Edmund H. Parry jr.
Attorney Patented Sept. 5, 1933

1,926,003

UNITED STATES PATENT OFFICE 1,926,003

EXPANSION JOINT

Robert Hall, Lockport, N. Y., assignor to American District Steam Company, North Tonawanda, N. Y., a corporation of New York Application August 25, 1932. Serial No. 630,472

5 Claims. (Cl. 285—162)

This invention relates to expansion structures adapted to use in steam and similar systems wherein it is necessary to make provision for shifting, expansion and contraction of the sections of pipe lines and conduits under changes in the conditions under which they operate.

The invention has particular reference to the type of expansion joint known as slip joints which comprise a plurality of members associated for relative sliding movement one within the other and which is provided with a non-metallic packing adapted to seal the joint against leakage. In known structures of this character, the packing deteriorates with use and allows the joint to leak. Also, particularly in joints employed in high pressure lines, the packing has a tendency to blow out because of the pressure difference between the inside and outside of the line. In renewing the packing when occasion requires it is ordinarily first necessary that the operation of the section of the pipe line in which the joint is located be discontinued, since leakage and line pressure will interfere generally with the repair work, and the seating and adjustment of a new packing so as to provide a leak-proof seal cannot properly be carried out.

The present invention provides an improved construction for expansion structures not subject to the disadvantages and objections such as those just referred, and which will increase the life and efficiency of the conventional packing and minimize the danger of the same blowing out, provide a more effective seal against leakage in the joint and enable the same to operate successfully under high pressures as well as under low and moderate pressures, and enable the joint packing to be removed and renewed readily and without interruption to the operation of the joint or the pipe system. Accordingly, sealing means are associated with one of the sliding members of the expansion structure additional to the conventional packing, and interposed between the packing and the inner end of the inner member of the joint so as to relieve the packing of part of its leak-preventing function and lessen its exposure to moisture and pressure which deteriorate the same and cause it to leak and blow out.

A further important feature of the invention is that the sealing means and outer packing are associated with the telescopic joint members in such manner so that a stop may be provided interiorally of the joint to limit the longitudinal movement of the joint members, the arrangement being such that the packing will yieldingly support a stop and thus prevent strain on the joint under sudden movement between the members.

The supplemental sealing means is preferably in the form of one or more metallic rings similar to those used in association with the pistons of internal combustion and other engines, such character elements being particularly adapted to withstand the destructive influences above referred to. Such elements are installed between the adjacent walls of the respective sliding members of the joint, one of the members being grooved to provide a retaining seat such as will hold the rings against movement under operation of the joint, and the other being nicely machined to enable the rings to slide relative thereto while maintaining a sealing contact. To provide an effective seal the rings should be resilient in character. If they are to be associated with the outer joint member they should be formed so as to have a tendency to contract in order that they may make sealing contact with the inner sliding member; if, as may be found more convenient, the rings are to be associated with the inner member and to have sliding contact with the outer joint member they should possess a tendency to expand.

To further facilitate the renewal of the conventional packing and to guard against the building up of any moisture or pressure at the packing seat in case the supplementary sealing means is not—as may well be the case at times under unfavorable conditions—entirely leakproof, it is further proposed, according to my invention, to locate a blow off between the packing and the sealing means which may be opened when the new packing is being installed. Of course, the supplementary sealing means will prevent any substantial leakage towards the packing even when the pipe line is operating under heavy load, and such slight leakage as may occur will be conducted outside the joint by the blow off without affecting the installation of the new packing or rendering it necessary to interrupt the operation of the line while such work is going on.

To provide an internal stop which takes advantage of the resiliency of the packing to prevent strain on the joint, the joint members are varied in diameter at different portions of their length. The outer joint member is provided with an annular chamber of enlarged diameter adjacent its end adapted to receive a ring which will form a stop adapted to coact with a shoulder formed on the inner joint member. The conventional packing will be inserted behind the ring so as to form a cushion therefor in addition to serving its usual function of sealing the joint. The inner joint member will be made of smaller diameter than the outer joint member and formed with an enlargement on its end carrying the sealing means above described and presenting a shoulder adapted to coact with the stop ring disposed in the packing chamber. The internal stop may be used alone or in association with a conventional stop located externally of the joint. In the latter event the internal stop will be arranged to engage the shoulder on the inner joint member preliminary to the time the external stop becomes operative. Under such arrangement the internal stop by reason of its yielding support on the packing will serve primarily to retard movement and prevent shock and strain upon the joint members before and when the external stop functions to bar any further movement of the joint members.

In order that the construction and operation of the expansion joint of my invention may be entirely clear, I will describe one embodiment thereof, reference being had in this connection to the accompanying drawing in which:

Fig. 1 is a view in longitudinal section illustrating a conventional type of expansion structure with my invention embodied therein;

Fig. 2 is a transverse section taken on line 2—2 of Fig. 1; and,

Fig. 3 is a perspective view of one type of sealing element which may be utilized in accordance with my invention.

Referring now to the drawing, I have shown therein an expansion structure comprising a plurality of members telescopically arranged one within the other for relative longitudinal movement, the outer member being designated 10 and the inner member 11, and having farther ends adapted to be connected intermediate the ends of pipe sections. The bore of the outer member 10 is enlarged adjacent its inner end to provide an annular packing-holding chamber 12 in which is received a mass or annular strips of packing 13, and against which the member 11 has a sliding movement.

The packing 13 is held within the chamber 12 by a gland-element 14 arranged in operative association with the member 10 by means of a series of bolts 15 which extend through the gland-element and are threaded into the end flange 16 of said member. By reason of the fact that these bolts 15 are all arranged exteriorally of the outer joint member 10, the gland-element may be adjusted with respect to the packing 13 so that the compression thereon may be either increased or decreased without dismantling the parts of the joint. By removing the bolts and withdrawing the gland-element from association with the outer joint member the packing can be removed and renewed.

To insure free sliding movement of the joint members relative to each other any suitable guiding means may be employed. I have in Fig. 1 illustrated one type mechanism which has proved satisfactory, the same being heretofore known in the art and not being an essential part of the present invention. Such means includes an annular extension 17 secured to the end flange 16 of the outer joint member 10 and an enlargement or portion 18 screwed or otherwise secured to the exposed portion of the inner joint member 11, which has sliding contact with the inner surface of said annular element. With such an arrangement the joint members will be supported relative to each other at all times. The annular element 17 may be provided with an annular inwardly extending projection 19 which will constitute a stop against which the enlargement 18 of the inner member 11 will bear when the joint members have reached their outer limit of expansion.

In order that the gland-element will be accessible the annular element 17 is provided with openings such as 20 of sufficient size that a workman may adjust or renew the packing without difficulty.

The construction so far described is conventional. I will now describe the application of my invention thereto. The inner joint member 11 is preferably made of somewhat smaller diameter for the major portion of its length than the inner diameter of the outer joint member 10. The same is, however, provided with an end portion 21 adapted to slidingly engage the inner wall 22 of the outer joint member. The end 21 may be formed as a separate head and threaded on the joint member 11 as shown in the drawing. Since the head 21 is of larger diameter than that of the main portion of the inner member a shoulder 23 will be formed, the purposes of which will now be described. At the inner end of the annular packing chamber 12 in the outer joint member is disposed a ring 24 which seats against the shoulder 25 in said chamber. The inner periphery of the ring is smaller in diameter than that of the inner periphery of the joint member, and is substantially the same as the outer diameter of the inner joint member 11. With such arrangement it will be evident that the shoulder 23 on the head of the inner joint member will engage the ring when the two joint members are at the outer limit of their longitudinal movement. The packing 13 besides forming a seal will bear against the ring 24, by reason of its resilient character will yieldingly support the ring and allow the same to move longitudinally under pressure exerted by the shoulder. Such construction, in effect, provides a cushioned stop which will prevent strain upon the joint when the joint members suddenly move to their extreme outer limit.

The head 21 of the inner joint member is, as above stated, in close sliding engagement with the inner wall 22 of the outer joint member, serving to support and guide the inner joint member in its sliding movement. The main portion of the inner joint member 11 being of smaller diameter than the head may be guided by the gland-element 14 which for such purpose has an inner diameter substantially the same as that of the inner joint member. Thus the inner joint member is supported and guided on both sides of the packing chamber 12.

When used with the external rigid stop including elements 18 and 19 above described, the normal position of the internal stop ring 24 may be such as to engage the shoulder 23 before the external stop becomes operative as indicated in Fig. 1. With such an arrangement the internal stop will not only act cooperatively with the external stop but will serve as a buffer as the ring 24 compresses the packing 13 to prevent elements 18 and 19 from contacting with such force as might strain the parts of the joint.

Located between the inner wall 22 of the outer joint member 10 and the head 21 of the inner member 11, inwardly of the packing 13, I provide supplementary sealing means adapted to function in cooperation with the packing and enabling the packing to be renewed without rendering the joint inoperative. Such means may comprise one or more metallic resilient rings 26. To prevent the same from getting out of its proper position between the walls of the joint members during their sliding movement, and to enable elements of satisfactory annular thickness to be used, one of the members is grooved as indicated at 27 to form a recess in which the sealing means may seat. The sealing means may thus be secured in association with one of the joint members and have a leak-proof sliding contact with the other member. In the embodiment illustrated, the sealing means is secured in recesses in the head of the inner joint member 11.

Between the supplemental sealing means 26 and the packing 13, an expansion channel or groove 28 is provided in the inner wall of the outer joint member 10, the same being intended to receive any leakage which may occur at the supplemental sealing means and minimize any unfavorable effect thereof against the packing.

A blow off plug 29 is also provided in the outer joint member, the same being conveniently located in line with the expansion channel 28. By so locating the plug between the packing and sealing means, it will be understood that the same may be removed at any time while the joint is in operation to exhaust any moisture or pressure which may have built up in the space between the packing and sealing means since the sealing means alone is effective to prevent any substantial leakage from the interior of the joint.

The plug is preferably also removed when it is necessary to renew the packing since it is desirable that no pressure or moisture enter the packing housing 12 or contact with new packing until the same is fully installed and the gland-element bolted in place.

The outer end of the outer joint member 10 has a flange 30 for securing the same to a pipe section, bolt holes 31 being provided for this purpose.

It will be evident that the novel construction of my invention greatly improves slip-type expansion joints by providing an additional sealing means which cooperates with the conventional packing in its leak-preventing function, lengthens the life of the packing by minimizing the deteriorating influences ordinarily brought to bear thereon, and enables the packing to be renewed without making it necessary to render the joint inoperative. The internal stop which in cooperation with the resilient packing limits the longitudinal movement of the joint members without strain on the parts also materially increases the desirability of the joint and enables it to be used under conditions where longitudinal movement is sudden and forceful.

It will be understood that my invention is capable of a considerable range of modification and equivalency without departing from the salient features thereof, so I do not intend to be limited in the practice of my invention further than may be required by the accompanying claims.

What I claim is:

1. An expansion joint comprising a plurality of annular members associated in close fitting contact one within the other for relative sliding movement, an enlargement in the bore of the outer member adjacent the inner member, packing in the enlarged portion bearing against the inner member, a gland-element to hold the packing in position and adapted to be removed to permit the withdrawal and renewal of the packing, a recess in one of the joint members adjacent the other member located between the packing and the interior of the joint, supplementary sealing means in said recess preventing direct communication between the packing and the interior of the joint and adapted to cooperate with the packing and permit the same to be withdrawn and renewed while the joint is in operation, a blow off located between the packing and supplementary sealing means and adapted to be opened during renewal of the packing to allow the escape of any leakage passing the supplementary sealing means, and an annular channel in the outer member adjacent the inner member and connecting with the blow off.

2. An expansion joint having a plurality of members associated for relative sliding movement one within the other, the outer joint member being of enlarged bore adjacent its end to provide a packing chamber, compressible packing in said chamber forming a seal between the joint members, the inner joint member being of less diameter than the bore of the outer member and having an enlargement at its end providing a shoulder, a cushioned internal stop adapted to limit longitudinal between the joint members comprising a free ring engageable with the shoulder on the inner member located in the packing chamber, said ring being yieldingly supported by the packing so that it may give by compressing the packing upon engagement with the shoulder, and additional stop means located exteriorally of the joint, the cushioned stop being arranged to become operative under longitudinal movement between the joint members slightly before the external stop.

3. An expansion joint comprising a pair of pipe member slidable one within the other, the inner member being of less diameter than the bore of the outer member and being provided with an enlarged head making bearing contact with the outer member and presenting a shoulder at the inner end of the head, sealing means between the head and the outer member in the form of one or more metallic rings carried in small grooves in the head, the outer member being of uniform bore for part of its length and adjacent its end being of enlarged bore to provide a packing chamber, flexible packing in the chamber forming a seal between the outer member and the portion of the inner member beyond the enlarged head, a gland element for compressing the packing, a rigid ring having a lesser inner diameter than the bore of the outer member and coactive with the shoulder on the head of the inner member yieldingly supported in the inner end of the chamber by the packing, and an annular recess in the outer member forming an expansion chamber located intermediate the inner and outer seals between the joint members and adjacent the packing chamber, and a blow-off communicating with said recess.

4. An expansion joint comprising a pair of pipe members telescoping one within the other, the outer member being of uniform bore for the major portion of its length, the inner member being of lesser diameter than the bore of the outer member, a guide head of greater diameter than the inner member and of substantial length in close fitting sliding engagement with the bore of the outer member secured to the inner end of the inner joint member, said head at its inner end presenting a straight shoulder with the inner member, sealing means between the head and the outer joint member carried in one or more peripheral grooves in the head, a packing chamber adjacent the end of the outer joint member formed by an enlargement in the bore, flexible packing in the chamber forming a sealing between the outer member and the portion of the inner member beyond the guide head, a gland element for compressing the packing, and a rigid ring having a lesser inner diameter than the bore of the outer member and coactive with the shoulder on the head of the inner member yieldingly supported at the inner end of the chamber by the packing.

5. An expansion joint comprising a pair of pipe members slidable one within the other, the outer member being of uniform bore for the main portion of its length, an enlarged guide and sealing head adapted to closely fit the bore of the outer member secured to the inner end of the inner member, said head acting as an internal guide during movement between the joint members and having one or more peripheral recesses carrying rings which provide a seal between the inner and outer joint members, the inner member beyond the head being of lesser diameter than the bore of the outer member and said head at its inner end presenting a straight shoulder, the outer joint member adjacent its end being of enlarged bore to provide a packing chamber, flexible packing in the chamber forming a further seal between the outer joint member and the portion of the inner member beyond the enlarged head, a gland element for compressing the packing, a rigid ring having a lesser inner diameter than the bore of the outer member and coactive with the shoulder on the head of the inner member yieldingly supported in the inner end of the chamber by the packing, and additional guiding means for the joint members coactive with the internal guiding means provided by engaging portions slidable with respect to each other located externally beyond the end of the packing chamber.

ROBERT HALL.